United States Patent
Tyminski et al.

(10) Patent No.: US 12,196,838 B2
(45) Date of Patent: Jan. 14, 2025

(54) METHOD OF DETERMINING A DISTANCE BETWEEN A FIRST DEVICE AND A SECOND DEVICE

(71) Applicant: NXP B.V., Eindhoven (NL)

(72) Inventors: Jacek Tyminski, Lassnitzhoehe (AT); Sandeep Mallya, Bangalore (IN); Pradeep Kumar Aithagani, Hyderabad (IN)

(73) Assignee: NXP B.V., Eindhoven (NL)

( * ) Notice: Subject to any disclaimer, the term of this patent is extended or adjusted under 35 U.S.C. 154(b) by 471 days.

(21) Appl. No.: 17/658,933

(22) Filed: Apr. 12, 2022

(65) Prior Publication Data
US 2022/0342063 A1 Oct. 27, 2022

(30) Foreign Application Priority Data

Apr. 22, 2021 (IN) .............................. 202111018589
Jun. 4, 2021 (EP) .................................... 21177843

(51) Int. Cl.
*G01S 11/08* (2006.01)
(52) U.S. Cl.
CPC ..................................... *G01S 11/08* (2013.01)
(58) Field of Classification Search
CPC ........................................................ G01S 11/08
See application file for complete search history.

(56) References Cited

U.S. PATENT DOCUMENTS

| 7,450,069 | B2 | 11/2008 | Heidari-Bateni et al. |
| 10,926,738 | B1 | 2/2021 | Tucci et al. |
| 2005/0026563 | A1* | 2/2005 | Leeper ...................... G01S 5/14 455/41.1 |
| 2012/0026041 | A1* | 2/2012 | Murdock .................. G01S 5/14 342/357.51 |

OTHER PUBLICATIONS

De Nardis, L., "Overview of the IEEE 802.15.4/4a standards for low data rate Wireless Personal Data Networks", 4th Workshop on Positioning, Navigation and Communication, Mar. 22, 2007.

(Continued)

*Primary Examiner* — Cassi J Galt (57) ABSTRACT

A method of determining a distance between a first device and a second device. The method comprises: performing an initial-ranging-operation, by exchanging two multi-frame ranging cycles between the first device and the second device, to calculate a clock ratio and a multi-frame-cycle-ToF. The method further comprises performing a plurality of single-message ranging cycles, wherein each single-message ranging cycle comprises: at a predetermined first-device-cycle-time after an earlier message is sent from the first device to the second device, the first device sending a single-ranging-message to the second device; determining a second-device-cycle-time as the time between the second device receiving the single-ranging-message and the earlier message being received by the second device; determining a current-message-ToF based on: the previous-message-ToF, the first-device-cycle-time, the clock ratio, and the second-device-cycle-time. The current-message-ToF represents the time of flight of the single-ranging-message travelling from the first device to the second device.

20 Claims, 3 Drawing Sheets

(56) References Cited

OTHER PUBLICATIONS

Denis, B., "Ranging Protocols and Network Organization", IEEE P802.15 Working Group for Wireless Personal Area Networks (WPANs), Aug. 2004.
Dotlic, I., "Ranging Methods Utilizing Carrier Frequency Offset Estimation", 2018 15th Workshop on Positioning, Navigation and Communication (WPNC), Oct. 25-26, 2018.
Lee, J.X., "One Way Ranging Time Drift Compensation for Both Synchronized and Non-Synchronized Clocks", 2010 International Conference on Systems Science and Engineering, Jul. 2010.

* cited by examiner

METHOD OF DETERMINING A DISTANCE BETWEEN A FIRST DEVICE AND A SECOND DEVICE

CROSS-REFERENCE TO RELATED APPLICATIONS

This application claims the priority under 35 U.S.C. § 119 of India application Ser. No. 20/211,1018589, filed on 22 Apr. 2021, and EP application Ser. No. 21/177,843.6, filed on 4 Jun. 2021, the contents of which are incorporated by reference herein.

FIELD

The present disclosure relates to methods of determining a distance between a first device and a second device and in particular, although not exclusively to performing ranging operations in an automotive application that use a reduced number of frames.

SUMMARY

According to a first aspect of the present disclosure there is provided a method of determining a distance between a first device and a second device, the method comprising:
 performing an initial-ranging-operation, by exchanging two multi-frame ranging cycles between the first device and the second device, to calculate:
  a clock ratio, wherein the clock ratio represents the ratio of a clock speed at the first device to a clock speed at the second device; and
  a multi-frame-cycle-ToF as the time difference between a message being sent by the first device and being received by the second device as part of the initial-ranging-operation;
 setting a previous-message-ToF as the multi-frame-cycle-ToF;
 performing a plurality of single-message ranging cycles, wherein each single-message ranging cycle comprises:
  at a predetermined first-device-cycle-time after an earlier message is sent from the first device to the second device, the first device sending a single-ranging-message to the second device;
  determining a second-device-cycle-time as the time between the second device receiving the single-ranging-message and the earlier message being received by the second device;
  determining a current-message-ToF based on:
   the previous-message-ToF,
   the first-device-cycle-time,
   the clock ratio, and
   the second-device-cycle-time,
  wherein the current-message-ToF represents the time of flight of the single-ranging-message travelling from the first device to the second device;
  calculating a distance between the first device and the second device based on the current-message-ToF; and
  setting the previous-message-ToF for the next single-message ranging cycle as the current-message-ToF.

Such a method can be advantageous in terms of one or more of: reducing the power consumed by both devices when performing the ranging operation, reducing the channel occupancy because fewer frames are being transmitted over the air, and also reducing system cost.

In one or more embodiments the first device is an initiator device. The second device may be a responder device. The method may further comprise one or more of the following steps;
 performing a first multi-frame ranging cycle, which includes:
  the initiator device sending a first-cycle-first-message to the responder device; and
  in response to receiving the first-cycle-first-message, the responder device sending a first-cycle-second-message back to the initiator device;
 performing a second multi-frame ranging cycle, which includes:
  the initiator device sending a second-cycle-first-message to the responder device after a first-ranging-time, wherein the first-ranging-time is the time between the first-cycle-first-message being sent and the second-cycle-first-message being sent; and
  in response to receiving the second-cycle-first-message, the responder device sending a second-cycle-second-message back to the initiator device;
 measuring a second-ranging-time as the time between the first-cycle-first-message being received and the second-cycle-first-message being received;
 calculating a first-cycle-ToF as the time difference between the first-cycle-first-message being sent by the initiator device and received by the responder device;
 calculating a second-cycle-ToF as the time difference between the second-cycle-first-message being sent by the initiator device and received by the responder device;
 calculating a clock ratio based on the first-ranging-time, the second-ranging-time, the first-cycle-ToF and the second-cycle-ToF; and
 setting the multi-frame-cycle-ToF as the first-cycle-ToF or the second-cycle-ToF.

In one or more embodiments, for the first single-message ranging cycle, the earlier message is the second-cycle-first-message. For the second and subsequent single-message ranging cycles, the earlier message may be the single-ranging-message from an earlier single-message ranging cycle.

In one or more embodiments, for the second and subsequent single-message ranging cycles, the earlier message is the single-ranging-message from the immediately preceding earlier single-message ranging cycle.

In one or more embodiments the method further comprises:
 the initiator device sending a first-cycle-third-message to the responder device in response to receiving the first-cycle-second-message, as part of the first multi-frame ranging cycle; and
 the initiator device sending a second-cycle-third-message to the responder device in response to receiving the second-cycle-second-message, as part of the second multi-frame ranging cycle.

In one or more embodiments the second device is an initiator device. The first device may be a responder device. The method may further comprise one or more of the following steps:
 performing a first multi-frame ranging cycle, which includes:
  the initiator device sending a first-cycle-first-message to the responder device; and
  in response to receiving the first-cycle-first-message, the responder device sending a first-cycle-second-message back to the initiator device;

performing a second multi-frame ranging cycle, which includes:
the initiator device sending a second-cycle-first-message to the responder device after a first-ranging-time, wherein the first-ranging-time is the time between the first-cycle-first-message being sent and the second-cycle-first-message being sent; and
in response to receiving the second-cycle-first-message, the responder device sending a second-cycle-second-message back to the initiator device;
measuring a second-ranging-time as the time between the first-cycle-first-message being received and the second-cycle-first-message being received;
calculating a first-cycle-ToF as the time difference between the first-cycle-second-message being sent by the responder device and received by the initiator device;
calculating a second-cycle-ToF as the time difference between the second-cycle-second-message being sent by the responder device and received by the initiator device;
calculating a clock ratio based on the first-ranging-time, the second-ranging-time, the first-cycle-ToF and the second-cycle-ToF;
setting the multi-frame-cycle-ToF as the first-cycle-ToF or the second-cycle-ToF.

In one or more embodiments the method further comprises:
setting the predetermined first-device-cycle-time by scaling a predetermined cycle-time of the initiator based on the clock ratio.

In one or more embodiments the predetermined cycle-time comprises the first-ranging-time.

In one or more embodiments, for the first single-message ranging cycle, the earlier message is the second-cycle-second-message. For the second and subsequent single-message ranging cycles, the earlier message may be the single-ranging-message from an earlier single-message ranging cycle.

In one or more embodiments, for the second and subsequent single-message ranging cycles, the earlier message is the single-ranging-message from the immediately preceding earlier single-message ranging cycle.

In one or more embodiments the method further comprises:
the initiator device sending a first-cycle-third-message to the responder device in response to receiving the first-cycle-second-message, as part of the first multi-frame ranging cycle; and
the initiator device sending a second-cycle-third-message to the responder device in response to receiving the second-cycle-second-message, as part of the second multi-frame ranging cycle.

In one or more embodiments the two multi-frame ranging cycles are single-sided or double-sided two-way ranging cycles.

In one or more embodiments the method further comprises:
after performing N single-message ranging cycles, performing a recalibration-ranging-operation by exchanging two multi-frame ranging cycles between the first device and the second device to recalculate:
the clock ratio; and
the multi-frame-cycle-ToF;
resetting the previous-message-ToF as the recalculated multi-frame-cycle-ToF; and performing a further plurality of single-message ranging cycles using the recalculated clock ratio and the reset previous-message-ToF.

In one or more embodiments the method further comprises:
adjusting the value of N over time.

According to a further aspect of the disclosure there is provided a system comprising a first device and a second device, wherein the system is configured to:
perform an initial-ranging-operation, by exchanging two multi-frame ranging cycles between the first device and the second device, to calculate:
a clock ratio, wherein the clock ratio represents the ratio of a clock speed at the first device to a clock speed at the second device; and
a multi-frame-cycle-ToF as the time difference between a message being sent by the first device and being received by the second device as part of the initial-ranging-operation;
set a previous-message-ToF as the multi-frame-cycle-ToF; and
perform a plurality of single-message ranging cycles, wherein each single-message ranging cycle comprises:
at a predetermined first-device-cycle-time after an earlier message is sent from the first device to the second device, the first device sending a single-ranging-message to the second device;
determining a second-device-cycle-time as the time between the second device receiving the single-ranging-message and the earlier message being received by the second device;
determining a current-message-ToF based on:
the previous-message-ToF,
the first-device-cycle-time,
the clock ratio; and
the second-device-cycle-time,
wherein the current-message-ToF represents the time of flight of the single-ranging-message travelling from the first device to the second device;
calculating a distance between the first device and the second device based on the current-message-ToF; and
setting the previous-message-ToF for the next single-message ranging cycle as the current-message-ToF.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

Figure 1:
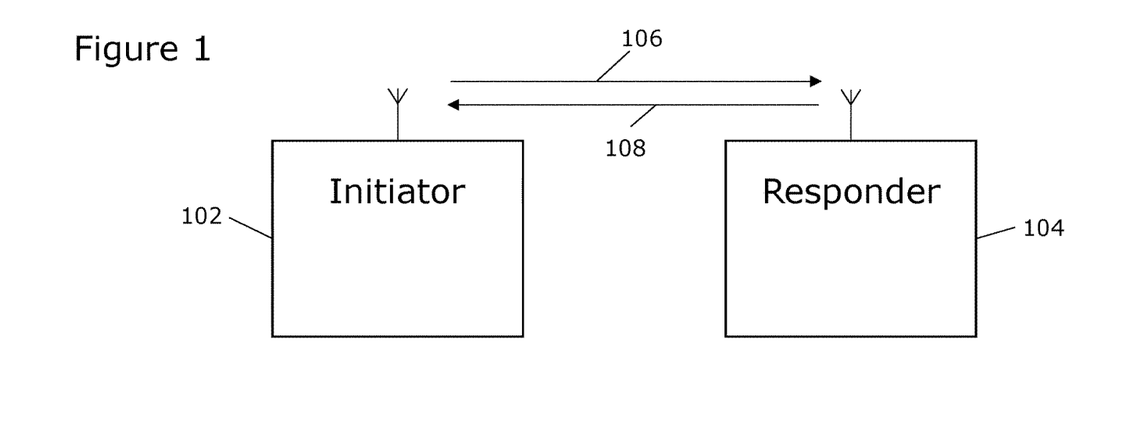
FIG. 1 shows schematically two devices, which are labelled as an initiator and a responder.

FIG. 1 shows schematically two devices, which are labelled as an initiator 102 and a responder 104. The initiator 102 can initiate a ranging operation in order to determine a distance between the initiator 102 and the responder 104. As will be discussed below, the distance can be determined by either the initiator 102 or the responder 104. As part of the determination the initiator 102 sends messages/frames 106 to the responder 104, and the responder 104 sends messages/frames 108 to the initiator 102. In some applications these messages/frames can be ultra-wideband (UWB) frames/messages.

The initiator 102 can be considered as a first device and the responder 104 can be considered as a second device in some examples. In other examples, the responder 104 can be considered as the first device and the initiator 102 can be considered as the second device.

In one application, the initiator 102 and the responder 104 can be part of an automotive application. For instance, one of the initiator 102 and the responder 104 can be associated with an access system for an automobile (such as a locking system for the automobile), and the other of the initiator 102 and the responder 104 can be associated with a key or smartphone that is carried by a user in order to gain access to the automobile. As is known in the art, such a user can gain access to the automobile when they are sufficiently close to the automobile. The initiator 102 can begin such a ranging operation, such that either the initiator 102 or the responder 104 determines the distance to the other device.

Based on the IEEE 802.15.4 standard there have been many systems proposed for accurate ranging and positioning. Single-Sided Two-Way-Ranging and Double-Sided Two-Way-Ranging require at least 2 or 3 frames for each ranging cycle. Others can be based on Time Difference of Arrival, which require at least 2 synchronized anchors/receivers (separate ICs) associated with the automobile, which complicates the system and increases its cost.

Other applications that can use ranging operations are Internet of Things (IoT) applications. For example to determine the distance between a smartphone and a tag. It will be appreciated that the systems and methods described herein are not limited to any particular application.

Figure 2A:
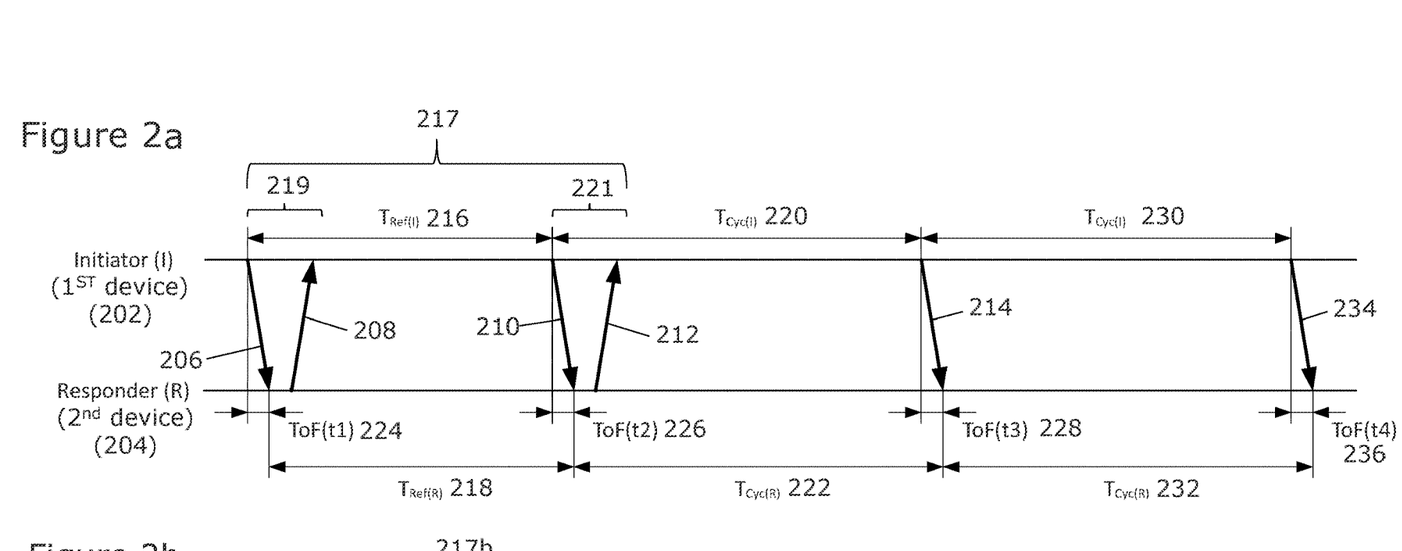
FIGS. 2a and 2b are timing diagrams that show frame exchange between an initiator and a responder as part of a method for determining a distance between the initiator and the responder.
Figure 2B:
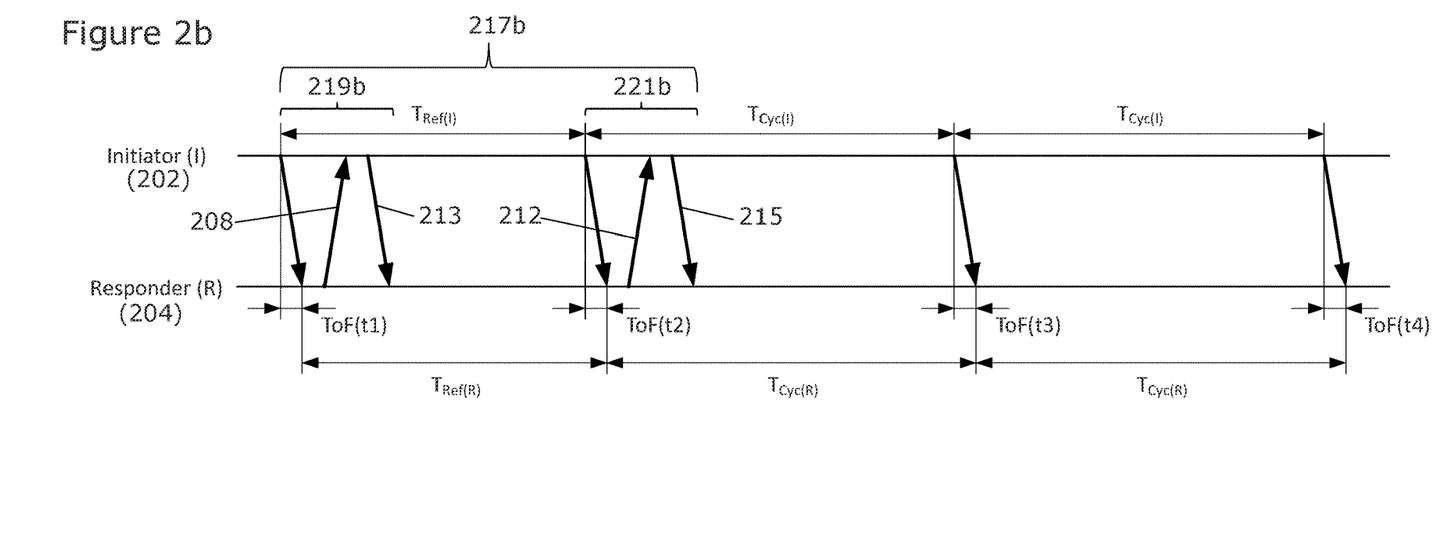

FIGS. 2a and 2b are timing diagrams that show frame exchange between an initiator 202 and a responder 204 as part of a method for determining a distance between the initiator 202 and the responder 204. This process is also known as ranging. The initiator (I) 202 is the device that initiates the ranging cycles, and the responder (R) 204 is the device that responds to the ranging initiation request sent by the initiator 202. In FIGS. 2a and 2b, the initiator 202 is an example of a first device and the responder 204 is an example of a second device.

As will be discussed in detail below, after two multi-frame ranging cycles have been performed single frame ranging operations are used to determine the distance between the two devices. Such single frame ranging operations involve only one frame being transmitted from the first device (the initiator 202 in FIGS. 2a and 2b) to the second device (the responder 204 in FIGS. 2a and 2b). This is advantageous when compared to continuing with multi-frame ranging cycles in terms of: reducing the power consumed by both devices when performing the ranging operation, reducing the channel occupancy because fewer frames are being transmitted over the air, and also reducing system cost.

Examples disclosed herein are based on an ultra-wideband (UWB) transmitter and receiver, which use clock counters and time stamp units for measuring time distance between UWB frames/messages. Such systems can be supported by sidelobe suppression, first path detection and sub sample peak detection algorithms, which are used in the UWB receiver after the channel response estimator. This can provide a base for time-of-flight measurements with sub clock accuracy.

In FIGS. 2a and 2b the initiator 202 and the responder 204 are UWB ranging devices that communicate with each other using UWB frames/messages. The UWB ranging devices can be compliant with the IEEE 802.15.4 standard, but examples disclosed herein are not limited to this standard. The examples disclosed herein can be used in other ranging systems, based on other standards.

FIG. 2a will be used to describe a method of determining a distance between the initiator 202 (a first device in this example) and the responder 204 (a second device in this example). The method begins by performing an initial-ranging-operation 217, by exchanging two multi-frame ranging cycles 219, 221 between the initiator 202 and the responder 204. The two multi-frame ranging cycles 219, 221 can be standard ranging cycles, in that they are well-known in the art as ways to determine a time-of-flight (ToF), and therefore distance, between two devices.

As will be discussed in detail below, the two multi-frame ranging cycles 219, 221 are performed in order to calculate: a clock-ratio and a multi-frame-cycle-ToF. The clock-ratio represents the ratio of a clock speed at the initiator 202 to a clock speed at the responder 204. The multi-frame-cycle-ToF is the time difference between a message being sent by the initiator 202 and being received by the responder 204 as part of the initial-ranging-operation 217. In this example, the multi-frame-cycle-ToF is a second-cycle-ToF (ToF(t2)) 226 (as will be discussed below). In other examples, the multi-frame-cycle-ToF is a first-cycle-ToF (ToF(t1)) 224.

We will now describe one example method of calculating the clock-ratio and the multi-frame-cycle-ToF with reference to FIG. 2a, where the initiator 202 is the first device and the responder 204 is the second device. Another example will be described below with reference to FIGS. 3a and 3b where the responder is the second device, and the initiator is the first device.

A first multi-frame ranging cycle 219 includes the initiator 202 sending a first-cycle-first-message 206 to the responder 204. In response to receiving the first-cycle-first-message 206, the responder 204 sends a first-cycle-second-message 208 back to the initiator 202.

A second multi-frame ranging cycle 221 includes the initiator 202 sending a second-cycle-first-message 210 to the responder device 204 after a first-ranging-time ($T_{REF(I)}$) 216. The first-ranging-time is the time between the first-cycle-first-message 206 being sent and the second-cycle-first-message 210 being sent. In response to receiving the second-cycle-first-message 210, the responder 204 sends a first-cycle-second-message 212 back to the initiator device 202.

In this example, the responder 204 then measures a second-ranging-time ($T_{REF(R)}$) 218 as the time between the first-cycle-first-message 206 being received and the second-cycle-first-message 210 being received.

The following can then be calculated, again in this example by the responder 204:
- a first-cycle-ToF (ToF(t1)) 224;
- a second-cycle-ToF (ToF(t2)) 226; and
- a clock-ratio (k).

The first-cycle-ToF (ToF(t1)) 224 is the time difference between the first-cycle-first-message 206 being sent by the initiator 202 and received by the responder 204. The first-cycle-ToF (ToF(t1)) 224 can be calculated in any way that is known in the art, for example by calculating half of the difference between the round time (time measured by the initiator 202 between transmitted frame 206 and received frame 208) and the response time (time measured by the responder 204 between the received frame 206 and the transmitted frame 208). This time can be additionally scaled by the clock ratio k if known at this point from previous cycles or can be estimated based on carrier frequency offset or estimated after receiving the second multi-frame ranging cycle 221.

The second-cycle-ToF (ToF(t2)) 226 is the time difference between the second-cycle-first-message 210 being sent by the initiator 202 and received by the responder 204. Again, the second-cycle-ToF (ToF(t2)) 226 can be calculated in any way known in the art.

The clock ratio (k) is based on the first-ranging-time ($T_{REF(I)}$) 216, the second-ranging-time ($T_{REF(R)}$) 218, the first-cycle-ToF (ToF(t1)) 224 and the second-cycle-ToF (ToF(t2)) 226. In this example, the clock ratio (k) is calculated as:

$$k = f_{clk(I)}/f_{clk(R)} = (T_{Ref(R)} - \Delta ToF)/T_{Ref(I)} = (T_{Ref(R)} - ToF(t2) + ToF(t1))/T_{Ref(I)}$$

where $\Delta ToF$ is the change of the time of flight between the first multi-frame ranging cycle 219 (the first-cycle-ToF (ToF(t1)) 224) and the second multi-frame ranging cycle 221 (the second-cycle-ToF (ToF(t2)) 226). Typically the expected change of time of flight $\Delta ToF$ is much smaller than the reference time $T_{REF(R)}$ 226 and therefore can be neglected.

In this way, dividing the reference time measured on the responder side by the reference time measured on the initiator side results in the factor k, which represents the clock ratio between the initiator 202 and the responder 204. Since the time stamp of the received frame can be measured with a certain error FT'S, to improve the factor k accuracy, a relatively long reference time $T_{Ref(I)}$ 216 can be used. However, with a relatively long reference time $T_{Ref(I)}$ 216, there is a higher probability that the time of flight (ToF) will change. Therefore, there is a trade-off between the accuracy of the calculated clock ratio k and the likelihood that the ToF will change during the initial-ranging-operation 217. Before the number of transmitted frames is reduced to 1 for the subsequent ranging cycles, the clock ratio/offset between the initiator 202 and the responder 204 is measured first. In this example, as described in detail above, this is achieved by using two standard ranging cycles. A single-sided two-way-ranging operation can be used, as shown in FIG. 2a. Alternatively, a double-sided two-way-ranging operation can be used, as shown in FIG. 2b. The only difference between FIGS. 2a and 2b is that the initial-ranging-operation 217b in FIG. 2b also includes: the initiator 202 sending a first-cycle-third-message 213 to the responder 204 in response to receiving the first-cycle-second-message 208 as part of the first multi-frame ranging cycle 219b; and the initiator 202 sending a second-cycle-third-message 215 to the responder 204 in response to receiving the second-cycle-second-message 212 as part of the second multi-frame ranging cycle 221b. An advantage of using double-sided ranging is that when calculating ToF(t1) 224, the clock ratio k is not required up-front; instead it can be implicitly calculated by formulae that are known in the art. Irrespective of whether single-sided or double-sided two-way-ranging is used, generally speaking the time distance between the two multi-frame ranging cycles is defined as a reference time ($T_{ref(I)}$) 216.

Returning to FIG. 2a, a plurality of single-message ranging cycles 214, 234 are then performed. As indicated above, advantageously each single-message ranging cycles 214, 234 includes the transmission of only one message/frame yet can still be used to obtain a reliable measurement of the distance between the initiator 202 and the responder 204. In this example it is the responder 204 that calculates the distance between the two devices 202, 204, which is convenient because the responder 204 has the information required to calculate the measurement more readily available. Although it will be appreciated that the responder 204 could transmit the appropriate information to the initiator 202 to calculate the distance between the two devices 202, 204 in other examples.

For the first single-message ranging cycle the method sets a previous-message-ToF (ToF(n−1)) as the multi-frame-cycle-ToF that was calculated as part of the initial-ranging-operation 217. In this example the multi-frame-cycle-ToF is the second-cycle-ToF (ToF(t2)) 226, although in other examples the multi-frame-cycle-ToF can be the first-cycle-ToF (ToF(t1)) 224 while still being able to obtain satisfactory results.

Each single-message ranging cycle includes, at a predetermined first-device-cycle-time ($T_{Cyc(I)}$) 220, 230 after an earlier message is sent from the initiator 202 to the responder 204, the initiator sending a single-ranging-message 214, 234 to the responder 204. For the first single-message ranging cycle, in this example the initiator 202 sends the single-ranging-message 214 at a predetermined first-device-cycle-time ($T_{Cyc(I)}$) 220 after the second-cycle-first-message 210 is sent from the initiator 202 to the responder 204. For the second and subsequent single-message ranging cycles, in this example the initiator 202 sends the single-ranging-message 234 at the predetermined first-device-cycle-time ($T_{Cyc(I)}$) 220 after the single-ranging-message 214 from the previous single-message ranging cycle. Although in other examples it will be appreciated that different earlier messages can be used as reference points for determining when the initiator 202 should send the next single-ranging-message 214, 234.

The responder 204 then determines a second-device-cycle-time ($T_{Cyc(R)}$) 222, 232 as the time between the responder 204 receiving the single-ranging-message 214, 234 and the earlier message being received by the responder 204. For the first single-message ranging cycle, the second-device-cycle-time ($T_{Cyc(R)}$) 222 is the time between the responder 204 receiving the first single-ranging-message 214 and receiving the second-cycle-first-message 210 at the responder 204. For the second and subsequent single-message ranging cycles, the second-device-cycle-time ($T_{Cyc(R)}$) 232 is the time between the responder 204 receiving the single-ranging-message 234 of the current cycle and receiving the single-ranging-message 214 from the previous cycle.

The responder then determines a current-message-ToF (ToF(n)) 228, 236 based on:
- the previous-message-ToF (ToF(n−1)), which is: the ToF from the preceding single-message ranging cycle if there is one; or is the ToF from the initial-ranging-operation,
- the first-device-cycle-time ($T_{Cyc(I)}$),
- the clock-ratio (k); and
- the second-device-cycle-time ($T_{Cyc(R)}$).

The current-message-ToF (ToF(n)) 228, 236 represents the time of flight of the single-ranging-message 214, 234 travelling from the initiator 202 to the responder 204.

In this example, the current-message-ToF (ToF(n)) is calculated as:

$$ToF(n)=ToF(n-1)+\Delta ToF=ToF(n-1)+T_{Cyc(R)}-k \cdot T_{Cyc(I)}$$

In this way, the calculated value of the clock ratio k between the initiator 202 and the responder 204 is used such that ranging cycles that include only a single frame can provide sufficient information for a ToF to be calculated. For cycles where only a single frame is transmitted, the ToF can be calculated using a previous ToF value and adding a value representing a ToF change (ΔToF), that can be calculated based on clock ratio k and the delay between ranging cycles measured on both initiator and responder side ($T_{Cyc(I)}$ and $T_{Cyc(R)}$).

The responder can then calculate a distance between the initiator 202 and the responder 204 based on the current-message-ToF (ToF(n)) 228.

In preparation for the next single-message ranging cycle 234, the method involves setting the previous-message-ToF (ToF(n−1)) for the next single-message ranging cycle as the current-message-ToF (ToF(n)). In this way, for the second and subsequent single-message ranging cycles, the time of flight can be calculated in exactly the same manner. This can be considered as accumulating the ToF changes (ΔToF).

Figure 3A:
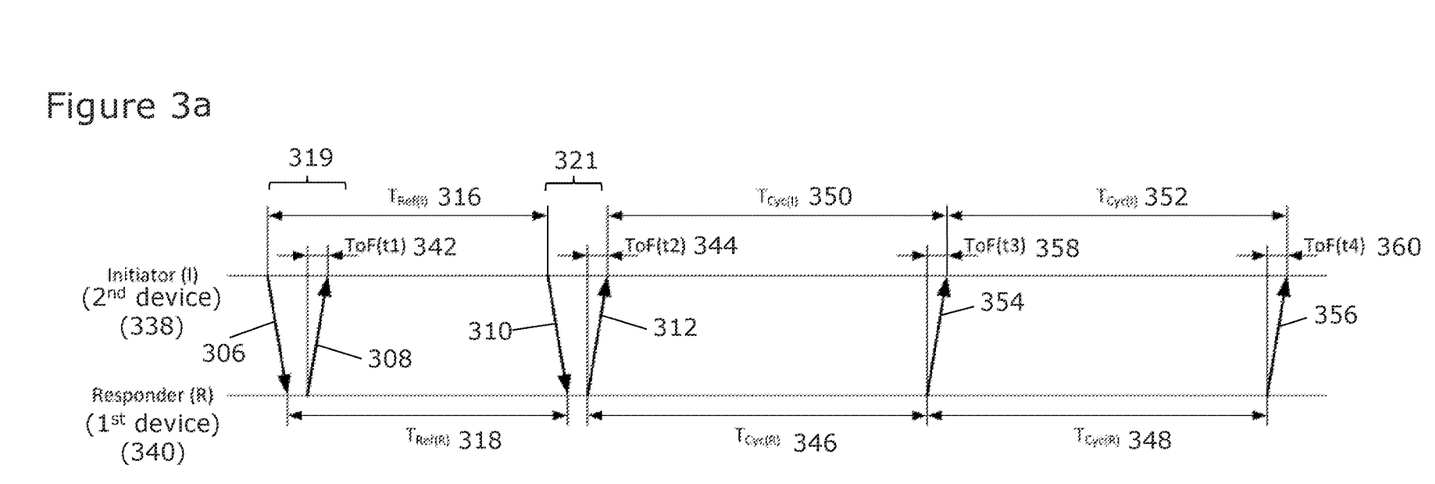
FIGS. 3a and 3b are timing diagrams that show frame exchange between an initiator and a responder as part of another method for determining a distance between the initiator and the responder.
Figure 3B:
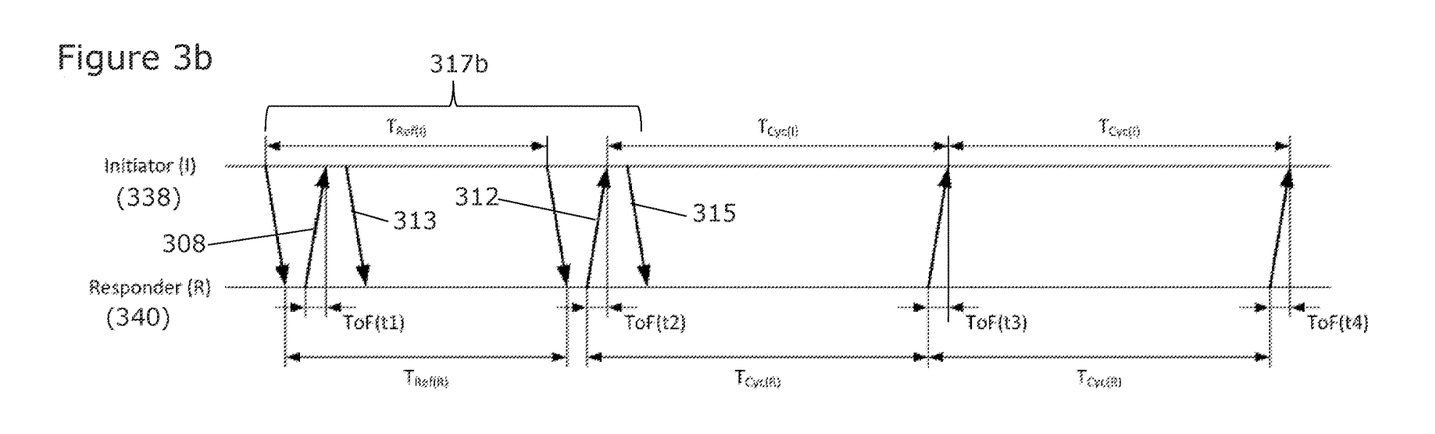

FIGS. 3a and 3b are timing diagrams that show frame exchange between an initiator 338 and a responder 340 as part of another method for determining a distance between the initiator 338 and the responder 340. In FIGS. 3a and 3b, the responder 340 is an example of a first device and the initiator 338 is an example of a second device. After two multi-frame ranging cycles have been performed, single frame ranging operations are performed that involve only one frame being transmitted from the first device (the responder 340 in FIGS. 3a and 3b) to the second device (the initiator 338 in FIGS. 3a and 3b) in order to determine the distance between the two devices. This is in contrast to FIGS. 2a and 2b where the initiator 202 transmits the single frames as part of the single frame ranging operations.

In a similar way to that described above with reference to FIG. 2a, in FIG. 3a the method performs a first multi-frame (standard) ranging cycle 319. The first multi-frame ranging cycle 319 includes the initiator 338 sending a first-cycle-first-message 306 to the responder 340. In response to receiving the first-cycle-first-message 306, the responder 340 sends a first-cycle-second-message 308 back to the initiator 338. The method then performs a second multi-frame ranging cycle 321. The second multi-frame ranging cycle 321 includes the initiator 338 sending a second-cycle-first-message 310 to the responder 338 after a first-ranging-time ($T_{REF(I)}$) 316. The first-ranging-time ($T_{REF(I)}$) 316 is the time between the first-cycle-first-message 306 being sent and the second-cycle-first-message 310 being sent. In response to receiving the second-cycle-first-message 310, the responder 340 sends a second-cycle-second-message 312 back to the initiator 338.

The responder 340 in this example then measures a second-ranging-time ($T_{REF(R)}$) 318 as the time between the first-cycle-first-message 306 being received and the second-cycle-first-message 310 being received.

In this example, either the initiator 338 or the responder 340 then calculates the following:
- a first-cycle-ToF (ToF(t1)) 342;
- a second-cycle-ToF (ToF(t2)) 344; and
- a clock-ratio (k).

The first-cycle-ToF (ToF(t1)) 342 in this example is the time difference between the first-cycle-second-message 308 being sent by the responder 340 and received by the initiator 338.

The second-cycle-ToF (ToF(t2)) 344 in this example is the time difference between the second-cycle-second-message 312 being sent by the responder 340 and received by the initiator 338.

The clock-ratio (k) is based on the first-ranging-time ($T_{REF(I)}$), the second-ranging-time ($T_{REF(R)}$), the first-cycle-ToF (ToF(t1)) and the second-cycle-ToF (ToF(t2)) in the same way as described above with reference to FIG. 2a.

In this example, where the initiator 338 will not be the device that sends the single frames 354, 356 as part of the subsequent single-message ranging cycles, the initiator 338 determines a first-device-cycle-time ($T_{Cyc(R)}$) 346, 348 as the time delay before the responder 340 sends another single frame 354, 356.

The initiator 338 in this example uses a reference/ideal cycle-time $T_{Cyc(Ideal)}$ for setting the first-device-cycle-time ($T_{Cyc(R)}$) 346, 348. The reference/ideal cycle-time $T_{Cyc(ideal)}$ may be determined/predetermined in that it has a fixed/known value before it is applied, although it need not necessarily be the same value each time it is used for setting the first-device-cycle-time ($T_{Cyc(R)}$) 346, 348. The determined reference/ideal cycle-time $T_{Cyc(Ideal)}$ may or may not be the same as the first-ranging-time ($T_{REF(I)}$) 316. In this way, a determined cycle-time is used that originates from the initiator time scale (that is, the initiator 338 sets the time reference).

The responder 340 can then set first-device-cycle-time ($T_{Cyc(R)}$) 346, 348 by scaling the predetermined/reference/ideal cycle-time of the initiator $T_{Cyc(Ideal)}$ by the clock ratio k. In this way: the time scales can match as closely as possible to the expected time scale at the initiator 338; and the cycle times on the responder side $T_{Cyc(R)}$ 346, 348 match as closely as possible to the reference/ideal cycle time $T_{Cyc(Ideal)}$. That is, the first-device-cycle-time ($T_{Cyc(R)}$) 346, 348 can be set as the following:

$$T_{Cyc(R)}=k \cdot T_{Cyc(Ideal)}$$

In a similar way to that described above with reference to FIG. 2a, in FIG. 3a the method continues by performing a plurality of single-message ranging cycles 354, 356.

For the first single-message ranging cycle, the method sets a previous-message-ToF (ToF(n−1)) as the multi-frame-cycle-ToF (ToF(t2)), which can be the second-cycle-ToF (ToF(t2)) 344 or the first-cycle-ToF (ToF(t1)) 342.

Each single-message ranging cycle includes, at the predetermined first-device-cycle-time ($T_{Cyc(R)}$) 346 after an earlier message is sent from the responder 340 to the initiator 338, the responder 340 sending a single-ranging-message 354, 356 to the initiator 338. For the first single-message ranging cycle, in this example the responder 340 sends the single-ranging-message 354 at a predetermined first-devicecycle-time ($T_{Cyc(R)}$) 346 after the second-cycle-second-message 312 is sent from the responder 340 to the initiator 338. For the second and subsequent single-message ranging cycles, in this example the responder 340 sends the single-ranging-message 356 at the predetermined first-device-cycle-time ($T_{Cyc(R)}$) 348 after the single-ranging-message 354 from the previous single-message ranging cycle. Although in other examples it will be appreciated that different earlier messages can be used as reference points for determining when the responder 340 should send the next single-ranging-message 354, 356.

The initiator 338 then determines a second-device-cycle-time ($T_{Cyc(I)}$) 350, 352 as the time between the initiator 338 receiving the single-ranging-message 354, 356 and the earlier message being received by the initiator 338. For the first single-message ranging cycle, the second-device-cycle-time ($T_{Cyc(I)}$) 350 is the time between the initiator 338 receiving the first single-ranging-message 354 and receiving the second-cycle-second-message 312 at the initiator 338. For the second and subsequent single-message ranging cycles, the second-device-cycle-time ($T_{Cyc(I)}$) 352 is the time between the initiator 338 receiving the single-ranging-message 356 of the current cycle and receiving the single-ranging-message 354 from the previous cycle.

In the same way as described above, the initiator 338 then determines a current-message-ToF (ToF(n)) 358, 360 based on:
- the previous-message-ToF (ToF(n−1)), which is: the ToF from the preceding single-message ranging cycle if there is one; or is the ToF from the initial-ranging-operation,
- the first-device-cycle-time ($T_{Cyc(R)}$),
- the clock-ratio (k); and
- the second-device-cycle-time ($T_{Cyc(I)}$).

In this example, the current-message-ToF (ToF(n)) is calculated as:

$$\text{ToF}(n) = \text{ToF}(n-1) + \Delta\text{ToF} = \text{ToF}(n-1) + T_{Cyc(I)} - k \cdot T_{Cyc(R)}$$
$$= \text{ToF}(n-1) + T_{Cyc(I)} - T_{Cyc(Ideal)}$$

In the same way as described above, in preparation for the next single-message ranging cycle, the method involves setting the previous-message-ToF (ToF(n−1)) for the next single-message ranging cycle as the current-message-ToF (ToF(n)).

In this way, the responder 340 uses a calculated time to send its single messages 354, 356. Advantageously, it tries to fit to the ideal cycle time $T_{Cyc(Ideal)}$ (the one agreed upfront) such that the single messages 354, 356 are received at the initiator 338 at times that generally corresponds to the predetermined cycle-time that is used for setting the first-device-cycle-time ($T_{Cyc(R)}$) 346, 348. The initiator 338 receives the single frames and measures the second-device-cycle-time $T_{Cyc(I)}$ 350, 352 between the frames. There will be some shifts in time by ΔToF, for instance of the order of a few nanoseconds (due to any changing distance between the initiator 338 and the responder 340), but these are very small comparing with typical cycle times that are of the order of a few milliseconds (roughly 6 orders of magnitude difference). The time shift is dominated by the distance change and therefore by the change of time-of-flight. Other factors, like time scale accuracy, time measurement error etc, shall be neglectable in a well-designed system.

This results in the responder 340 calculating the first-device-cycle-time ($T_{Cyc(R)}$) 346, 348 and the initiator 338 measuring the second-device-cycle-time ($T_{Cyc(I)}$) 350, 352, such that both values are very close to the initially agreed cycle time. This rationale for this approach is: the responder 340 tries to fit to the ideal (perfect) time grid, so that it doesn't drift away from the expected time slots. This can advantageously help to save power because the receiver of the single frames 354, 356 (the initiator 338 in this example) knows when the frame reception is expected and can be active for only a relatively short time window.

In this way, the time scale of the initiator 338 can be assumed as a reference time for all transactions (for the examples of FIGS. 2a and 2b too). In a multi-UWB device system, the reference time can be scaled upfront to match some other reference in the system.

FIG. 3a shows a single-sided two-way-ranging operation, in the same way as FIG. 2a. Alternatively, a double-sided two-way-ranging operation can be used, as shown in FIG. 3b. The only difference between FIGS. 3a and 3b is that the initial-ranging-operation 317b in FIG. 3b also includes: the initiator 338 sending a first-cycle-third-message 313 to the responder 340 in response to receiving the first-cycle-second-message 308 as part of the first multi-frame ranging cycle; and the initiator 338 sending a second-cycle-third-message 315 to the responder 340 in response to receiving the second-cycle-second-message 312 as part of the second multi-frame ranging cycle. Irrespective of whether single-sided or double-sided two-way-ranging is used, generally speaking the time distance between the two multi-frame ranging cycles is defined as a reference time ($T_{ref(I)}$) 316.

Examples described herein address a problem of clock offset between a first device and a second device (that include a transmitter and a receiver), which causes inaccuracy in ToF measurements, by estimating the clock offset based on a reference time defined as a time between 2 short frames (two multi-frame ranging cycles). The clock offset depends mostly on crystal drift, which depends mostly on temperature, which is relatively slow compared with the frequency of ranging cycles. Therefore, examples disclosed herein can estimate the clock offset very accurately measuring the drift of clock counters over a long period. By estimating the clock offset accurately, accuracy of single-sided ranging can be improved. Furthermore, after an initial clock offset measurement, the ranging cycles can be reduced to single frames for measuring time of flight (ToF), while keeping the accuracy within a predictable, acceptable range. The single frames can be transmitted by the initiator or the responder, as described with reference to FIGS. 2a, 2b, 3a and 3b, whichever is more convenient for the system. Yet further, by reducing ranging cycles to single frames, energy consumption can be reduced and channel occupancy can be limited.

Such examples can be preferable to estimating the clock offset by measuring carrier frequency offset (CFO) because such measurements can require a long observation window and a long frame to achieve acceptable accuracy, which results in high energy consumption.

Examples described herein enable the number of transmitted frames to be reduced to 1 for most ranging cycles, in a basic ranging system with a single anchor and a single tag, which can be a base for a positioning system.

Figure 4:
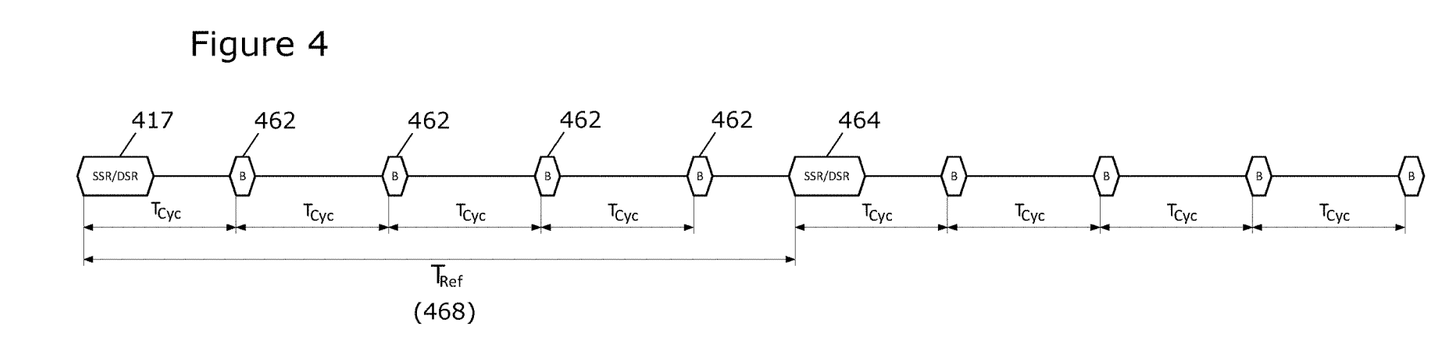
FIG. 4 illustrates an example protocol that shows single-sided ranging (SSR) or double-sided ranging (DSR) followed by N single frame ranging cycles.

FIG. 4 illustrates an example protocol that shows single-sided ranging (SSR) or double-sided ranging (DSR) 417 followed by N single frame ranging cycles 462 (marked B, after 'blink'). In FIG. 4, N=4.

It should be borne in mind that accumulating of the ToF changes as described above also causes the accumulation of measurements errors. Additionally, the clock ratio k between the initiator and the responder may change over time (which can be mostly dependent on the temperature changes of the crystal oscillator), and that this can also be used as a reason to limit the number of consecutive single frame ranging periods without recalibrating the clock ratio k.

FIG. 4 shows how the accumulation time (period of time where single frames are being used) can limited by the desired ToF accuracy. With this in mind, periodically or on-demand, a further initial-ranging-operation (which may be considered as a recalibration-ranging-operation) is performed for recalibrating/recalculating the clock ratio k and re-measuring/resetting the ToF value used as a start value (multi-frame-cycle-ToF) for the accumulation.

FIG. 4 shows an initial-ranging-operation 417, which may be a SSR or a DSR operation. Then after four single-frame ranging operations 462 have been performed, a recalibration-ranging-operation 464 is performed. In the same way as described above, the recalibration-ranging-operation 462 can be a full ranging cycle, either a single-sided or a double-sided two-way ranging cycle. This results in a protocol that uses a full ranging cycle (single-sided ranging (SSR) or double-sided ranging (DSR)) followed by N single frame ranging cycles 462.

The number N of single frame ranging cycles 462 can be individually adjusted to the system, and in some applications it can even be changed over time. The value of N can be set such that it depends on ranging accuracy requirements. Optionally, a recalibration-reference-period 468 can be used to define N, such that a recalibration-ranging-operation 462 is performed after the recalibration-reference-period 468 has expired, whereby the recalibration-reference-period 468 runs from the last full ranging cycle (either an initial-ranging-operation 417 or a preceding recalibration-ranging-operation).

Examples disclosed herein can use single frames for most of the ranging cycles and only sporadically use two-way ranging cycles for time synchronisation and crystal drift compensation. Beneficially, this can be performed without requiring a common clock source for the devices, without crystal characterization and without additional or auxiliary devices in the system. Furthermore, very short frames may be used for all ranging cycles and a CFO measurement is not needed. This provides savings in power consumption.

Examples of the present disclosure can be used in ranging systems, especially in a simple, cost-effective and battery-operated systems measuring distance or a gap between two devices. They may be used in an approach detector, for example in an automotive application for checking if a user (one device) is inside the car (distance to a second device inside). Examples can be well-suited to any application where a number of transmitted frames shall be limited to minimum.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A method of determining a distance between a first device and a second device, the method comprising:
performing an initial-ranging-operation, by exchanging two multi-frame ranging cycles between the first device and the second device, to calculate:
a clock ratio, wherein the clock ratio represents the ratio of a clock speed at the first device to a clock speed at the second device; and
a multi-frame-cycle-ToF as the time difference between a message being sent by the first device and being received by the second device as part of the initial-ranging-operation;
setting a previous-message-ToF as the multi-frame-cycle-ToF;
performing a plurality of single-message ranging cycles, wherein each single-message ranging cycle comprises:
at a predetermined first-device-cycle-time after an earlier message is sent from the first device to the second device, the first device sending a single-ranging-message to the second device;
determining a second-device-cycle-time as the time between the second device receiving the singleranging-message and the earlier message being received by the second device;
determining a current-message-ToF based on:
the previous-message-ToF,
the first-device-cycle-time,
the clock ratio, and
the second-device-cycle-time,
wherein the current-message-ToF represents the time of flight of the single-ranging-message travelling from the first device to the second device;
calculating a distance between the first device and the second device based on the current-message-ToF; and
setting the previous-message-ToF for the next single-message ranging cycle as the current-message-ToF.

2. The method of claim 1, wherein the first device is an initiator device, and the second device is a responder device, the method further comprising;
performing a first multi-frame ranging cycle, which includes:
the initiator device sending a first-cycle-first-message to the responder device; and
in response to receiving the first-cycle-first-message, the responder device sending a first-cycle-second-message back to the initiator device;
performing a second multi-frame ranging cycle, which includes:
the initiator device sending a second-cycle-first-message to the responder device after a first-ranging-time, wherein the first-ranging-time is the time between the first-cycle-first-message being sent and the second-cycle-first-message being sent; and
in response to receiving the second-cycle-first-message, the responder device sending a second-cycle-second-message back to the initiator device;
measuring a second-ranging-time as the time between the first-cycle-first-message being received and the second-cycle-first-message being received;
calculating a first-cycle-ToF as the time difference between the first-cycle-first-message being sent by the initiator device and received by the responder device;
calculating a second-cycle-ToF as the time difference between the second-cycle-first-message being sent by the initiator device and received by the responder device;
calculating a clock ratio based on the first-ranging-time, the second-ranging-time, the first-cycle-ToF and the second-cycle-ToF; and
setting the multi-frame-cycle-ToF as the first-cycle-ToF or the second-cycle-ToF.

3. The method of claim 2, wherein:
for the first single-message ranging cycle, the earlier message is the second-cycle-first-message; and
for the second and subsequent single-message ranging cycles, the earlier message is the single-ranging-message from an earlier single-message ranging cycle.

4. The method of claim 3, wherein:
for the second and subsequent single-message ranging cycles, the earlier message is the single-ranging-message from the immediately preceding earlier single-message ranging cycle.

5. The method of claim 2, further comprising:
the initiator device sending a first-cycle-third-message to the responder device in response to receiving the first-cycle-second-message, as part of the first multi-frame ranging cycle; and
the initiator device sending a second-cycle-third-message to the responder device in response to receiving the second-cycle-second-message, as part of the second multi-frame ranging cycle.

6. The method of claim 1, wherein the second device is an initiator device, and the first device is a responder device, the method further comprising:
performing a first multi-frame ranging cycle, which includes:
the initiator device sending a first-cycle-first-message to the responder device; and
in response to receiving the first-cycle-first-message, the responder device sending a first-cycle-second-message back to the initiator device;
performing a second multi-frame ranging cycle, which includes:
the initiator device sending a second-cycle-first-message to the responder device after a first-ranging-time, wherein the first-ranging-time is the time between the first-cycle-first-message being sent and the second-cycle-first-message being sent; and
in response to receiving the second-cycle-first-message, the responder device sending a second-cycle-second-message back to the initiator device;
measuring a second-ranging-time as the time between the first-cycle-first-message being received and the second-cycle-first-message being received;
calculating a first-cycle-ToF as the time difference between the first-cycle-second-message being sent by the responder device and received by the initiator device;
calculating a second-cycle-ToF as the time difference between the second-cycle-second-message being sent by the responder device and received by the initiator device;
calculating a clock ratio based on the first-ranging-time, the second-ranging-time, the first-cycle-ToF and the second-cycle-ToF;
setting the multi-frame-cycle-ToF as the first-cycle-ToF or the second-cycle-ToF.

7. The method of claim 6, further comprising:
setting the predetermined first-device-cycle-time by scaling a predetermined cycle-time of the initiator based on the clock ratio.

8. The method of claim 7, wherein the predetermined cycle-time comprises the first-ranging-time.

9. The method of claim 6, wherein:
for the first single-message ranging cycle, the earlier message is the second-cycle-second-message; and
for the second and subsequent single-message ranging cycles, the earlier message is the single-ranging-message from an earlier single-message ranging cycle.

10. The method of claim 9, wherein:
for the second and subsequent single-message ranging cycles, the earlier message is the single-ranging-message from the immediately preceding earlier single-message ranging cycle.

11. The method of claim 6, further comprising:
the initiator device sending a first-cycle-third-message to the responder device in response to receiving the first-cycle-second-message, as part of the first multi-frame ranging cycle; and
the initiator device sending a second-cycle-third-message to the responder device in response to receiving the second-cycle-second-message, as part of the second multi-frame ranging cycle.

12. The method of claim 1, wherein the two multi-frame ranging cycles are single-sided or double-sided two-way ranging cycles.

13. The method of claim 1, further comprising:
after performing N single-message ranging cycles, performing a recalibration-ranging-operation by exchanging two multi-frame ranging cycles between the first device and the second device to recalculate:
the clock ratio; and
the multi-frame-cycle-ToF;
resetting the previous-message-ToF as the recalculated multi-frame-cycle-ToF; and
performing a further plurality of single-message ranging cycles using the recalculated clock ratio and the reset previous-message-ToF.

14. The method of claim 13 further comprising:
adjusting the value of N over time.

15. A system comprising a first device and a second device, wherein the system is configured to:
perform an initial-ranging-operation, by exchanging two multi-frame ranging cycles between the first device and the second device, to calculate:
a clock ratio, wherein the clock ratio represents the ratio of a clock speed at the first device to a clock speed at the second device; and
a multi-frame-cycle-ToF as the time difference between a message being sent by the first device and being received by the second device as part of the initial-ranging-operation;
set a previous-message-ToF as the multi-frame-cycle-ToF; and
perform a plurality of single-message ranging cycles, wherein each single-message ranging cycle comprises:
at a predetermined first-device-cycle-time after an earlier message is sent from the first device to the second device, the first device sending a single-ranging-message to the second device;
determining a second-device-cycle-time as the time between the second device receiving the single-ranging-message and the earlier message being received by the second device;
determining a current-message-ToF based on:
the previous-message-ToF,
the first-device-cycle-time,
the clock ratio, and
the second-device-cycle-time,
wherein the current-message-ToF represents the time of flight of the single-ranging-message travelling from the first device to the second device;
calculating a distance between the first device and the second device based on the current-message-ToF; and
setting the previous-message-ToF for the next single-message ranging cycle as the current-message-ToF.

16. The method of claim 2, wherein the two multi-frame ranging cycles are single-sided or double-sided two-way ranging cycles.

17. The method of claim 2, further comprising:
after performing N single-message ranging cycles, performing a recalibration-ranging-operation by exchanging two multi-frame ranging cycles between the first device and the second device to recalculate:
the clock ratio; and
the multi-frame-cycle-ToF;
resetting the previous-message-ToF as the recalculated multi-frame-cycle-ToF; and
performing a further plurality of single-message ranging cycles using the recalculated clock ratio and the reset previous-message-ToF.

18. The method of claim 3, further comprising:
the initiator device sending a first-cycle-third-message to the responder device in response to receiving the first-cycle-second-message, as part of the first multi-frame ranging cycle; and
the initiator device sending a second-cycle-third-message to the responder device in response to receiving the second-cycle-second-message, as part of the second multi-frame ranging cycle.

19. The method of claim 7, wherein:
for the first single-message ranging cycle, the earlier message is the second-cycle-second-message; and
for the second and subsequent single-message ranging cycles, the earlier message is the single-ranging-message from an earlier single-message ranging cycle.

20. The method of claim 6, further comprising:
after performing N single-message ranging cycles, performing a recalibration-ranging-operation by exchanging two multi-frame ranging cycles between the first device and the second device to recalculate:
the clock ratio; and
the multi-frame-cycle-ToF;
resetting the previous-message-ToF as the recalculated multi-frame-cycle-ToF; and
performing a further plurality of single-message ranging cycles using the recalculated clock ratio and the reset previous-message-ToF.

* * * * *